Oct. 21, 1941.  A. BAYER ET AL  2,260,205
VEHICLE TIRE
Filed April 5, 1940
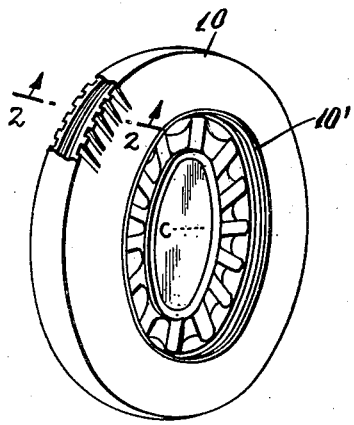
Fig.1.
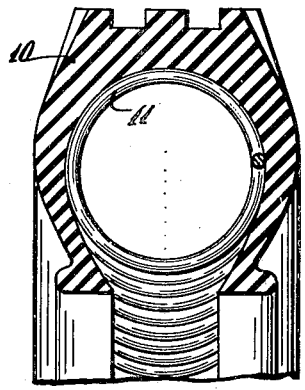
Fig.2.
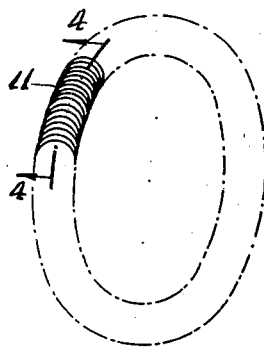
Fig.3.
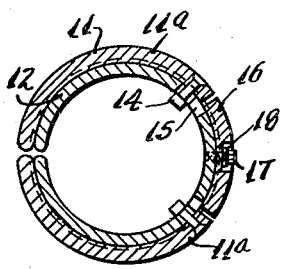
Fig.5.
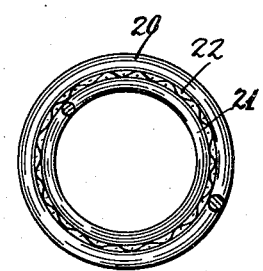
Fig.7.
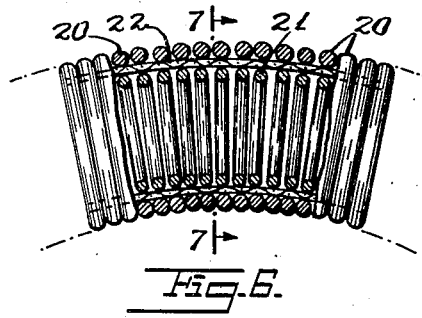
Fig.6.
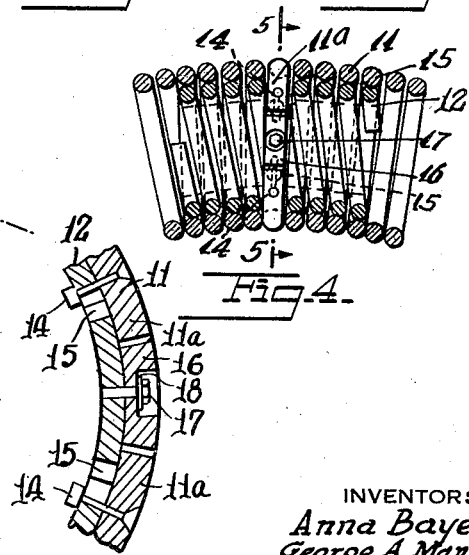
Fig.4.
Fig.5A
INVENTORS
Anna Bayer
George A. Manning
BY
ATTORNEY Patented Oct. 21, 1941

2,260,205

UNITED STATES PATENT OFFICE 2,260,205

VEHICLE TIRE

Anna Bayer and George A. Manning, New York, N. Y.

Application April 5, 1940, Serial No. 328,032

3 Claims. (Cl. 152—288)

This invention relates to new and useful improvements in a vehicle tire.

The invention has for an object the construction of a vehicle tire which does not require air pressure and which is equally as resilient as present day pneumatic tires.

More specifically, the invention contemplates the use of a tire shoe or casing and a continuous close wound wire spring mounted therein for holding the same resiliently in formation.

The invention specifically relates to the construction and arrangement of the wire spring within the tire shoe.

The invention proposes to characterize the wire spring by the fact that it is formed from a single strand of wire wound into a helical spring arranged with its ends adjacent each other to form an annular member and constructed in a manner so that the ends of its wire are in line with each other and slightly spaced. The invention then contemplates the use of a small length of close wound helical connector member within the adjacent ends of the spring for supporting the last few turns in a novel manner. It is proposed that headed fastening elements be mounted on the sides of the end portions of the wire and engage in bayonet slots formed in the helical connector member in a specific manner. An arrangement is also provided for holding the ends of the wire in a position so that the headed fastening elements cannot accidentally disengage from the bayonet slots.

For further comprehension of this invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a vehicle wheel with a tire constructed according to this invention.

Fig. 2 is a fragmentary enlarged transverse sectional view taken on the line 2—2 of Fig. 1 but illustrating the tire per se.

Fig. 3 is a perspective view of the wire spring per se.

Fig. 4 is a fragmentary enlarged sectional view on the line 4—4 of Fig. 3 and showing specifically the connector used for connecting the ends of the helical spring together.

Fig. 5 is a transverse sectional view on the line 5—5 of Fig. 4.

Fig. 5A is an enlarged detailed view of a portion of Fig. 5.

Fig. 6 is a fragmentary longitudinal sectional view of a helical spring for use in accordance with a modification of this invention.

Fig. 7 is a sectional view taken on the line 7—7 of Fig. 6.

The vehicle tire, according to this invention, comprises a tire shoe or casing 10 and a continuous close wound wire spring 11 mounted within said casing for holding same resiliently in formation. The casing 10 may be of any design or construction and have some form of tread. In Fig. 1 the tire is shown mounted on a wheel 10'. The spring 11 is constructed of a size so as to fit against the inner wall of the casing to hold the same in its proper formation. The spring 11 comprises, essentially, a close wound helical spring with its ends 11ª adjacent each other and forming an annular member for engagement within the tire shoe.

The ends 11ª of the wire of the spring are in line with each other, but slightly spaced, as clearly shown in Fig. 4.

A novel form of connector is provided for securing together the ends of the annular member formed by the helical spring. This means includes a small length of closely wound wire forming a helical connector member 12 disposed within the adjacent ends of the spring for supporting the last few turns thereof. The connector member 12 has its center coil extended parallel to the aligned ends of the wire forming the annular member 11. Headed fastening elements 14 are mounted upon the sides of the end portions 11ª of said wire and engage in bayonet slots 15 formed in the said helical connector member 12. A block 16 is removably attached upon the side of the helical connector 12 between the ends of 11ª of the wire 11 to hold the headed fastening elements fixedly in the bayonet slots. The parts are proportioned in the following manner.

The block 16 is of a length so that the headed fastening elements 14 are forced into the small ends of the bayonet slots. The bayonet slots 15 are arranged with their large ends directed towards each other. The block 16 is removably held by a cap screw 17 and a lock washer 18. The arrangement is such that the cap screw 17 may be removed and then the block 16 may be removed. The ends 11ª may be forced towards each other to press the heads of the fastening elements 14 into the large ends of the bayonet slots. The fastening elements may then be drawn outwards from the slots and so the connector member 12 is disengaged.

The feature of the connector member 12 resides in the fact that it forms a resilient connection resiliently connecting together the ends of the annular member in a manner so that the annular member is substantially continuous in formation and in its resilient action. The small length of connector member 12 will not substantially influence the resiliency of the annular member. The arrangement is such that the vehicle tire may turn and roll along the ground continuously in a smooth manner without any bumping or jerking action.

In Figs. 6 and 7 a modification of the invention has been disclosed in which the filler for the tire shoe is constructed somewhat differently. In this form of the invention the filler for the tire shoe is characterized by an outer close wound helical wire spring 20 engaged about and encasing an inner close wound helical spring 21. A tubular member 22 of soft material, such as cloth, is interposed between the contacting faces of the springs for holding them from directly contacting each other. The ends of the helical wire springs may be connected with each other to form complete concentric inter-engaged annular members. This filler is engaged in the tire to hold the tire casing resiliently in formation.

While we have illustrated and described the preferred embodiments of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:

1. In a device of the class described, an annular member formed of a closely coiled length of wire for insertion into a tire casing for resiliently holding the same in formation, said length of wire having its ends in line with each other and slightly spaced, a connector of helically coiled wire mounted in the ends of said annular member, said connector having its center coil extended parallel to the aligned ends of wire forming said annular member, and means for releasably attaching the ends of the wire forming said annular member to the center coil of said connector for supporting the last few turns of the wire forming said annular member, comprising headed elements mounted on the ends of the wire forming said annular member and extended through bayonet slots formed in the center coil of said connector and having their enlarged ends directed towards each other, and means engageable between ends of the wire forming said annular member for holding the ends spaced to prevent disengagement of the headed elements from said slots.

2. In a device of the class described, an annular member formed of a closely coiled length of wire for insertion into a tire casing for resiliently holding the same in formation, said length of wire having its ends in line with each other and slightly spaced, a connector of helically coiled wire mounted in the ends of said annular member, said connector having its center coil extended parallel to the aligned ends of wire forming said annular member, and means for releasably attaching the ends of the wire forming said annular member to the center coil of said connector for supporting the last few turns of the wire forming said annular member, comprising headed elements mounted on the ends of the wire forming said annular member and extended through bayonet slots formed in the center coil of said connector and having their enlarged ends directed towards each other, and means engageable between ends of the wire forming said annular member for holding the ends spaced to prevent disengagement of the headed elements from said slots, comprising an arcuately shaped block having its ends substantially contacting said ends, and means for removably mounting said block upon the center coil of said connector.

3. In a device of the class described, an annular member formed of a closely coiled length of wire for insertion into a tire casing for resiliently holding the same in formation, said length of wire having its ends in line with each other and slightly spaced, a connector of helically coiled wire mounted in the ends of said annular member, said connector having its center coil extended parallel to the aligned ends of wire forming said annular member, and means for releasably attaching the ends of the wire forming said annular member to the center coil of said connector for supporting the last few turns of the wire forming said annular member, comprising headed elements mounted on the ends of the wire forming said annular member and extended through bayonet slots formed in the center coil of said connector, and means engageable between ends of the wire forming said annular member for holding the ends spaced to prevent disengagement of the headed elements from said slots, comprising an arcuately shaped block having its ends substantially contacting said ends, and means for removably mounting said block upon the center coil of said connector, said bayonet slots having their enlarged ends directed towards each other, whereby said block may be removed from between the ends of the wire forming said annular member to permit said ends to be forced together to align the heads of said headed element with the enlarged portions of said bayonet slots to be passed therethrough to free said ends.

ANNA BAYER.
GEORGE A. MANNING.